(12) United States Patent
Zhou et al.

(10) Patent No.: US 11,764,915 B2
(45) Date of Patent: Sep. 19, 2023

(54) UPDATE OF BEAM CONFIGURATION FOR COMPONENT CARRIER GROUP

(71) Applicant: QUALCOMM Incorporated, San Diego, CA (US)

(72) Inventors: Yan Zhou, San Diego, CA (US); Mostafa Khoshnevisan, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 16/949,445

(22) Filed: Oct. 29, 2020

(65) Prior Publication Data

US 2021/0135802 A1 May 6, 2021

Related U.S. Application Data

(60) Provisional application No. 62/930,519, filed on Nov. 4, 2019.

(51) Int. Cl.
*H04L 5/00* (2006.01)
*H04W 72/0453* (2023.01)
*H04B 7/06* (2006.01)

(52) U.S. Cl.
CPC .......... *H04L 5/001* (2013.01); *H04B 7/0695* (2013.01); *H04W 72/0453* (2013.01)

(58) Field of Classification Search
CPC ..... H04L 5/001; H04L 5/0005; H04L 5/0007; H04B 7/0695; H04B 7/0617; H04W 72/0453
See application file for complete search history.

(56) References Cited

U.S. PATENT DOCUMENTS

2013/0176953 A1* 7/2013 Stern-Berkowitz ......................... H04W 52/365 370/329
2019/0208507 A1* 7/2019 Xiong ................... H04L 1/0061
(Continued)

OTHER PUBLICATIONS

Intel Corporation: "Discussion on Multi-Beam Enhancements," 3GPP Draft, 3GPP TSG RAN WG1 #98, R1-1908654, Discussion on Multi-Beam Enhancements, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051765262, 16 pages, Retrieved from the Internet: URL: http://www.3gpp.org/ftp/tsg_ran/WG1_RL1/TSGR1_98/Docs/R1-1908654.zip [retrieved on Aug. 17, 2019] paragraph [0004], figure 7, the Whole Document.

(Continued)

*Primary Examiner* — Christine Ng
(74) *Attorney, Agent, or Firm* — Harrity & Harrity, LLP

(57) ABSTRACT

A method, an apparatus, and a computer program product for wireless communication are provided. A user equipment (UE) may be configured to update beam configurations for specific component carriers or all component carriers in a component carrier group. The UE may receive a signaling message. The UE may apply an update to a beam configuration based at least in part on the signaling message. The UE may receive an indication of a set of component carriers and apply an update to the set of component carriers. The UE may update multiple beam configurations based at least in part on a selected configuration from the multiple beam configurations.

27 Claims, 13 Drawing Sheets

(56) References Cited

U.S. PATENT DOCUMENTS

| | | | | |
|---|---|---|---|---|
| 2019/0239245 | A1* | 8/2019 | Davydov | H04W 16/28 |
| 2019/0254049 | A1* | 8/2019 | Takeda | H04W 72/04 |
| 2019/0306850 | A1* | 10/2019 | Zhang | H04B 7/0639 |
| 2020/0351069 | A1* | 11/2020 | Grant | H04L 5/0092 |
| 2021/0153209 | A1* | 5/2021 | Guan | H04L 5/0023 |
| 2021/0259005 | A1* | 8/2021 | Yoshioka | H04L 1/0068 |
| 2021/0314927 | A1* | 10/2021 | Noh | H04L 5/0053 |
| 2022/0039129 | A1* | 2/2022 | Takeda | H04W 72/046 |

OTHER PUBLICATIONS

International Search Report and Written Opinion—PCT/US2020/058393—ISA/EPO—dated Feb. 16, 2021.

LG Electronics: "Feature Lead Summary#4 of Enhancements on Multi-beam Operations", 3GPP Draft, 3GPP TSG RAN WG1 Meeting #98, R1-1909779, R1#98 FL_Summary_Multibeam(MB1) V8. 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019 (Sep. 3, 2019), XP051766371, 38 Pages, Retrieved from the Internet: URL: http://www.3gpp.org/ftp/tsg_ran/WG1_RL1/TSGR1_98/Docs/R1-1909779.zip. [retrieved on Sep. 3, 2019] Discussion on R1-1908192. proposal 10; p. 28.

ZTE: "Enhancements on Multi-Beam Operation", 3GPP Draft, 3GPP TSG RAN WG1 Meeting #98, R1-1908192, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051764811, 26 Pages, Retrieved from the Internet: URL: http://www.3gpp.org/ftp/tsg_ran/WG1_RL1/TSGR1_98/Docs/R1-1908192.zip. [retrieved on Aug. 17, 2019] section 2.2.4.

European Search Report—EP22202358—Search Authority—The Hague—dated Jan. 23, 2023.

* cited by examiner

UPDATE OF BEAM CONFIGURATION FOR COMPONENT CARRIER GROUP

CROSS REFERENCE TO RELATED APPLICATION

This patent application claims priority to U.S. Provisional Patent Application No. 62/930,519, filed on Nov. 4, 2019, entitled "UPDATE OF BEAM CONFIGURATION FOR COMPONENT CARRIER GROUP," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for configurations for updating a beam configuration for a component carrier group.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (B Ss) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A BS may transmit a signaling message to a UE to update a beam configuration of the UE. For example, a BS may transmit a medium access control (MAC) control element (CE) to activate a set of transmission configuration indicator (TCI) states (e.g., associated with a set of TCI state identifiers) for a physical downlink shared channel (PDSCH). Some BSs may provide a signaling message of a first format signaling message (e.g., "legacy" format MAC CE) to update a specific bandwidth part (BWP) of a specific component carrier (CC). A second format signaling message (e.g., "new" format MAC CE) may update all CCs from a group of CCs. UEs that receive the legacy MAC CE are not instructed to apply a TCI update to all CCs from a group of CCs. This is inefficient and additional signaling is needed to apply the TCI update to all CCs from the group of CCs.

Some aspects described herein enable a UE to have more capability for updating a beam configuration of the UE, including for groups of CCs. For example, a UE may apply an update of a beam configuration, such as a TCI state, to all CCs from a group of CCs, even if the UE receives a legacy MAC CE. In this way, the UE obviates a need for additional signaling for updating a beam configuration for a group of CCs.

In some aspects, the UE may receive information indicating a set of CCs and apply the TCI state update across cell groups associated with the set of CCs. The set of CCs may be from the same cell group. In some aspects, to apply the update of the beam configuration, the UE may select a BWP from among multiple BWPs and apply the TCI states of that BWP to the TCI states of the multiple BWPs.

In some aspects, a method of wireless communication performed by a UE includes receiving a signaling message that indicates an update of a TCI state for BWPs, where the BWPs include multiple CCs from a group of CCs, and applying the update to a TCI state of at least one BWP in the group of CCs based at least in part on the signaling message.

In some aspects, a method of wireless communication performed by a base station includes determining a set of CCs with BWPs that are subject to an update of a TCI state, based at least in part on a determination of one or more cell groups associated with one or more CCs in the set of CCs, and transmitting an indication of the set of CCs.

In some aspects, a UE for wireless communication includes a memory and one or more processors operatively coupled to the memory, the memory and the one or more processors configured to receive a signaling message that indicates an update of a TCI state for BWPs, where the BWPs include multiple CCs in a group of CCs, and apply the update to a TCI state of at least one BWP from the group of CCs based at least in part on the signaling message.

In some aspects, a base station for wireless communication includes a memory and one or more processors operatively coupled to the memory, the memory and the one or more processors configured to determine a set of CCs with BWPs that are subject to an update of a TCI state, based at least in part on a determination of one or more cell groups associated with one or more CCs in the set of CCs, and transmit an indication of the set of CCs.

In some aspects, a method of wireless communication, performed by a UE, may include receiving a signaling message, where the signaling message is a first format signaling message that indicates an update of a TCI state for a particular BWP of a particular CC of a group of CCs or a second format signaling message that indicates an update of a TCI state for BWPs of multiple CCs in the group of CCs. The method may include applying an update to a TCI state of at least one BWP based at least in part on the signaling message and a message processing rule.

In some aspects, a method of wireless communication, performed by a base station, may include determining a set of CCs with BWPs that are subject to an update of a TCI state, based at least in part on a determination of one or more cell groups associated with one or more CCs in the set of CCs, and transmitting an indication of the set of CCs.

In some aspects, a method of wireless communication, performed by a UE, may include receiving an indication of a set of CCs and updating a TCI state of a respective BWP of each CC in the set of CCs.

In some aspects, a method of wireless communication, performed by a UE, may include identifying a respective number of TCI states of a respective BWP of each CC in a set of CCs, determining an update number based at least in part on the respective numbers, and updating the TCI states of the respective BWP of one or more CCs in the set of CCs, based at least in part on the update number.

In some aspects, a UE for wireless communication may include memory and one or more processors operatively coupled to the memory. The memory and the one or more processors may be configured to receive a signaling message, where the signaling message is a first format signaling message that indicates an update of a TCI state for a particular BWP of a particular CC of a group of CCs or a second format signaling message that indicates an update of a TCI state for BWPs of multiple CCs in the group of CCs. The memory and the one or more processors may be configured to apply an update to a TCI state of at least one BWP based at least in part on the signaling message and a message processing rule.

In some aspects, a base station for wireless communication may include memory and one or more processors operatively coupled to the memory. The memory and the one or more processors may be configured to determine a set of CCs with BWPs that are subject to an update of a TCI state, based at least in part on a determination of one or more cell groups associated with one or more CCs in the set of CCs; and transmit an indication of the set of CCs.

In some aspects, a UE for wireless communication may include memory and one or more processors operatively coupled to the memory. The memory and the one or more processors may be configured to receive an indication of a set of CCs and update a TCI state of a respective BWP of each CC in the set of CCs.

In some aspects, a UE for wireless communication may include memory and one or more processors operatively coupled to the memory. The memory and the one or more processors may be configured to identify a respective number of TCI states of a respective BWP of each CC in a set of CCs, determine an update number based at least in part on the respective numbers, and update the TCI states of the respective BWP of one or more CCs in the set of CCs, based at least in part on the update number.

In some aspects, a non-transitory computer-readable medium may store one or more instructions for wireless communication. The one or more instructions, when executed by one or more processors of a UE, may cause the one or more processors to receive a signaling message that indicates an update of a TCI state for BWPs, where the BWPs include multiple CCs from a group of CCs, and apply the update to a TCI state of at least one BWP in the group of CCs based at least in part on the signaling message.

In some aspects, a non-transitory computer-readable medium may store one or more instructions for wireless communication. The one or more instructions, when executed by one or more processors of a UE, may cause the one or more processors to receive a signaling message, where the signaling message is a first format signaling message that indicates an update of a TCI state for a particular BWP of a particular CC of a group of CCs or a second format signaling message that indicates an update of a TCI state for BWPs of multiple CCs in the group of CCs, and apply an update to a TCI state of at least one BWP based at least in part on the signaling message and a message processing rule.

In some aspects, a non-transitory computer-readable medium may store one or more instructions for wireless communication. The one or more instructions, when executed by one or more processors of a UE, may cause the one or more processors to determine a set of CCs with BWPs that are subject to an update of a TCI state, if one or more cell groups associated with one or more CCs in the set of CCs, and transmit an indication of the set of CCs.

In some aspects, a non-transitory computer-readable medium may store one or more instructions for wireless communication. The one or more instructions, when executed by one or more processors of a UE, may cause the one or more processors to receive an indication of a set of CCs and update a TCI state of a respective BWP of each CC in the set of CCs.

In some aspects, a non-transitory computer-readable medium may store one or more instructions for wireless communication. The one or more instructions, when executed by one or more processors of a UE, may cause the one or more processors to identify a respective number of TCI states of a respective BWP of each CC in a set of CCs, determine an update number based at least in part on the respective numbers, and update the TCI states of the respective BWP of one or more CCs in the set of CCs, based at least in part on the update number.

In some aspects, an apparatus for wireless communication may include means for receiving a signaling message that indicates an update of a TCI state for BWPs, where the BWPs include multiple CCs from a group of CCs, and means for applying the update to a TCI state of at least one BWP in the group of CCs based at least in part on the signaling message.

In some aspects, an apparatus for wireless communication may include means for receiving a signaling message, where the signaling message is a first format signaling message that indicates an update of a TCI state for a particular BWP of a particular CC of a group of CCs or a second format signaling message that indicates an update of a TCI state for BWPs of multiple CCs in the group of CCs, and means for applying an update to a TCI state of at least one BWP based at least in part on the signaling message and a message processing rule.

In some aspects, an apparatus for wireless communication may include means for determining a set of CCs with BWPs that are subject to an update of a TCI state, if one or more cell groups associated with one or more CCs in the set of CCs, and means for transmitting an indication of the set of CCs.

In some aspects, an apparatus for wireless communication may include means for receiving an indication of a set of CCs, and means for updating a TCI state of a respective BWP of each CC in the set of CCs.

In some aspects, an apparatus for wireless communication may include means for identifying a respective number of TCI states of a respective BWP of each CC in a set of CCs, means for determining an update number based at least in part on the respective numbers, and means for updating the TCI states of the respective BWP of one or more CCs in the set of CCs, based at least in part on the update number.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
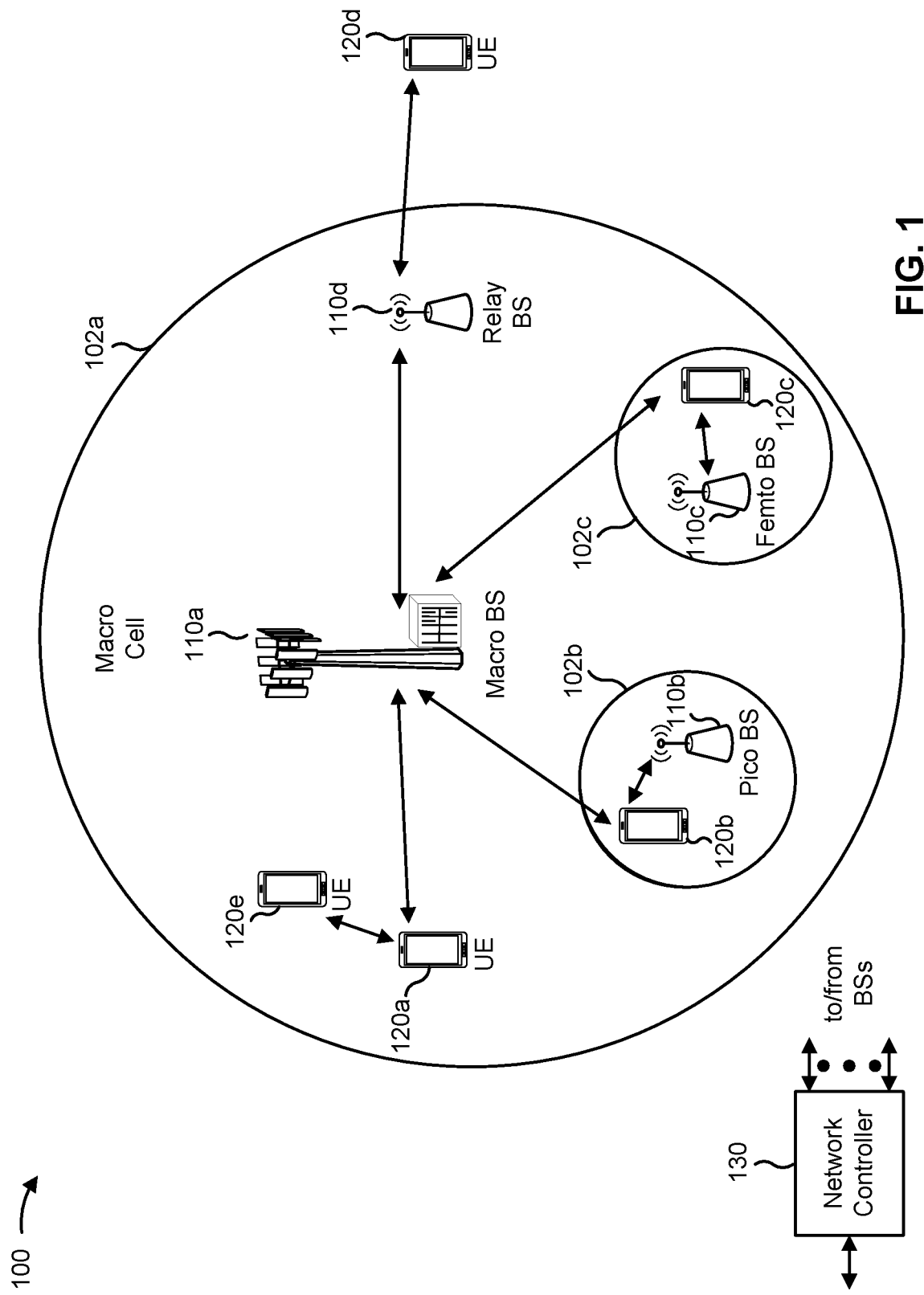
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
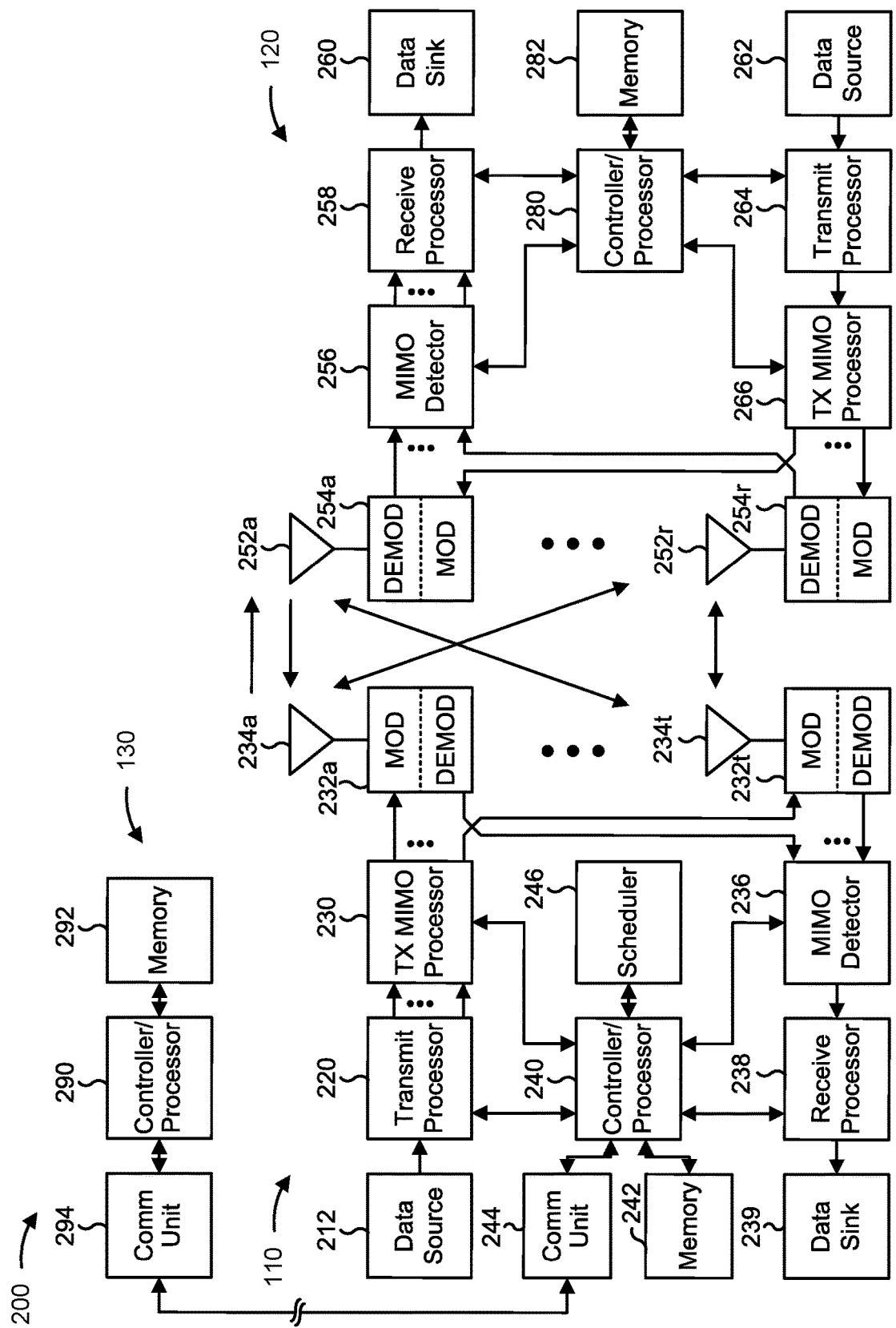
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), reference signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with updating a beam configuration for a component carrier (CC) group, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, method 800 of FIG. 8, method 900 of FIG. 9, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). 5G may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting nonbackward compatible MTC techniques, and/or mission critical targeting ultra-reliable low-latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some circumstances, DCells may not transmit synchronization signals. In some circumstances, DCells may transmit synchronization signals. 5G BSs may transmit downlink signals to UEs indicating the cell type. Based at least in part on the indicated cell type, the UE may communicate with the 5G BS. For example, the UE may determine 5G BSs to consider for cell selection, access, handover, and/or measurement based at least in part on the indicated cell type.

In some communications systems, such as 5G, a bandwidth may be divided into a plurality of bandwidth parts (BWPs) and/or a plurality of component carriers (CCs). Each BWP and/or CC may enable uplink and/or downlink communication between a UE and a BS using parameters that may be specific to the BWP and/or specific to the CC. For example, a UE may communicate with a BS on a first BWP in accordance with a first communication configuration and may communicate with the BS on a second BWP in accordance with a second communication configuration. This may enable flexibility in deployments of UEs, power saving configurations, and/or the like relative to a single communication configuration for an entire bandwidth.

A BS may transmit signaling to a UE to update a beam configuration of the UE. For example, a BS may transmit a medium access control (MAC) control element (CE) to activate a set of transmission configuration indicator (TCI) states (e.g., associated with a set of TCI state identifiers) for a physical downlink shared channel (PDSCH). The UE may apply the set of TCI states to update a set of TCI states of BWPs and/or CCs within a common band and/or sharing a common analog beamformer. The BS may provide radio resource control (RRC) signaling indicating a set of CCs and/or a set of BWPs corresponding to the set of CCs. The UE may define a group of CCs based at least in part on the set of CCs indicated by the RRC signaling. The UE may subsequently receive a signaling message, from the BS, indicating to which BWP and/or to which CC, of a plurality of candidate CCs, the UE is to apply an update of a TCI state. This signaling message may be a MAC CE of a first format, and may be referred to as a "legacy" MAC CE for discussion purposes.

A more recent standard may provide for a BS to transmit a signaling message (e.g., MAC CE) of a second format, which may be referred to as a "new" MAC CE for discussion purposes, indicating to which group of CCs the UE is to apply an update of a TCI state. In this way, when the UE receives a new MAC CE to apply an update of a TCI state, the UE may apply the update to all CCs in the group of CCs rather than to just a particular BWP and CC or may apply the update to all CCs of the plurality of candidate CCs. This update is specific for all CCs in a group of CCs may be referred to as a group CC-based PDSCH beam update.

While some 5G networks may have BSs that transmit a new MAC CE to update a TCI state of a group of CCs for a UE, some 5G networks still have BSs that transmit "legacy" MAC CEs to update TCI states. UEs that receive the legacy MAC CEs are not instructed to apply a TCI update to all CCs in a group of CCs. This is inefficient and additional signaling is needed to apply the TCI update to all CCs in the group of CCs. As a result, the BS and the UE use more network resources and power and are involved in more UE complexity.

Some aspects described herein enable a UE to have more capability for updating a beam configuration of the UE, including for groups of CCs. For example, a UE may apply an update of a TCI state to all CCs from a group of CCs, even if the UE receives a legacy MAC CE. In some aspects, a UE may receive a signaling message that is a first format signaling message (e.g., legacy MAC CE) or a second format signaling message (e.g., new MAC CE) and apply an update to a TCI state based at least in part on the signaling message and a message processing rule. The message processing rule may indicate that the update of the TCI state is to be applied to BWPs in the group of CCs when the signaling message is the first format signaling message (legacy MAC CE) or the second format signaling message (new MAC CE). In this way, the UE obviates a need for additional signaling for updating a beam configuration for a group of CCs. The UE and the BS enable reduced use of network resources, reduced power consumption, reduced UE complexity, and/or the like.

Figure 3:
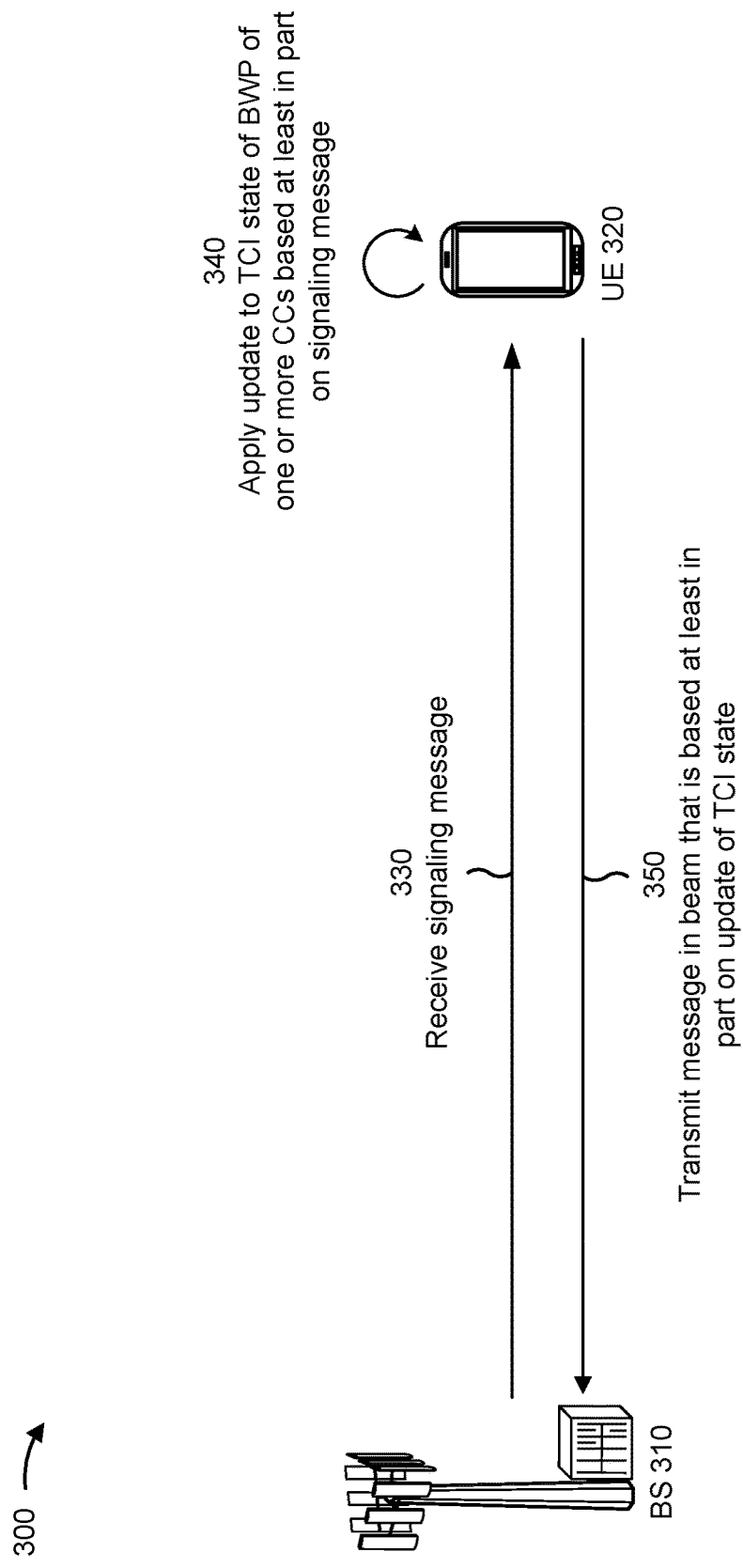
FIG. 3 is a diagram illustrating an example of updating a beam configuration of a component carrier group.

FIG. 3 is a diagram illustrating an example 300 of updating a beam configuration for a CC group. As shown in FIG. 3, example 300 includes a BS 310 (e.g., BS 110) that may communicate with a UE 320 (e.g., UE 120).

At 330, UE 320 may receive a signaling message from BS 310. The signaling message may be a first format signaling message (e.g., "legacy" MAC CE) or a second format signaling message (e.g., "new" MAC CE). UE 320 may be able to handle either signaling message format. In some aspects, UE 320 may be configured to receive and process one or more other signaling message formats for updating a beam configuration of UE 320.

At 340, UE 320 may apply an update to a TCI state of one or more BWPs based at least in part on the signaling message and, in some aspects, a message processing rule. UE 320 may use one or more message processing rules to determine how to handle a signaling message and perform an update of a beam configuration. In some aspects, a message processing rule may apply an update to CCs that is different than specified by a format of the signaling message.

In some aspects, the message processing rule may indicate that the update of the TCI state is to be applied to BWPs of multiple (e.g., all or a subset) CCs in a group of CCs when the signaling message is either the first format signaling message or the second format signaling message. For a legacy MAC CE, for example, specifying a TCI update for a particular BWP and a particular CC from a CC group, the message processing rule may specify that UE 320 is to apply the TCI update to multiple (e.g., all or a subset) CCs in the group of CCs.

Additionally, or alternatively, for a new MAC CE specifying a TCI update for a CC group, the message processing rule may specify that UE 320 is to process the new MAC CE such that the TCI state update is to be applied as expected for the new MAC CE. For example, UE 320 may update multiple (e.g., all or a subset) CCs in the group of CCs.

In some aspects, the message processing rule may indicate that the update of the TCI state is to be applied to a particular BWP and a particular CC in a CC group when the signaling message is the first format signaling message. For a legacy MAC CE, for example, specifying a TCI update for a particular BWP and a particular CC in a CC group, the message processing rule may specify that UE 320 is to process the legacy MAC CE such that the TCI state update is applied as expected for the legacy MAC CE. In other words, UE 320 may update only the particular CC.

In some aspects, UE 320 may receive multiple signaling messages. In this case, UE 320 may apply an update based at least in part on applying the message processing rule to a last received signaling message. For example, if UE 320 received a legacy MAC CE and then a new MAC CE close in time such that the UE 320 is deciding between two signaling messages, UE 320 may apply a TCI state update as specified in the message processing rule for the new MAC CE (i.e., the last received signaling message).

At 350, UE 320 may transmit a message in a beam that is based at least in part on the update of the TCI state. For example, the beam may have a beam configuration determined by a set of TCI states, which may have been updated as a result of the signaling message. As indicated above, FIG. 3 is provided as an example. Other examples may differ from what is described with respect to FIG. 3.

Figure 4:
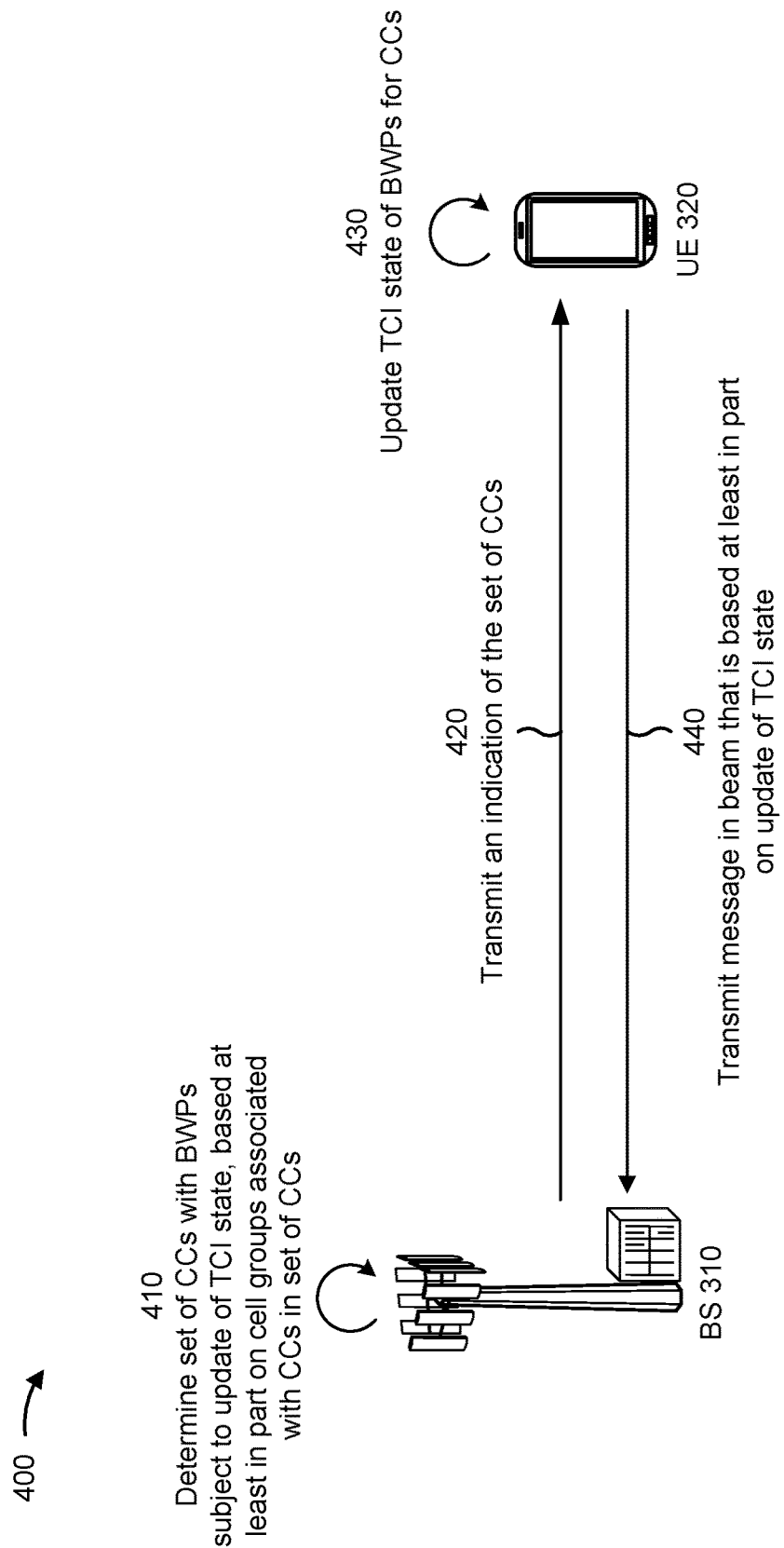
FIG. 4 is a diagram illustrating an example of determining a set of component carriers for updating a beam configuration.

FIG. 4 is a diagram illustrating an example 400 of determining a set of CCs for updating a beam configuration. In some aspects, BS 310 may configure or help to define UE 320 with one or more sets of CCs.

At 410, BS 310 may determine a set of CCs. In some aspects, the set of CCs may include a group of CCs, multiple groups of CCs, a list of CCs, and/or the like. BS 310 may determine the set of CCs based at least in part on cell groups associated with CCs in the set of CCs. In some aspects, all CCs in the set of CCs may be associated with a same cell group. In some aspects, the same cell group is a single master cell group (MCG). In some aspects, the same cell group is a single secondary cell group (SCG).

In some aspects, one or more CCs in the set of CCs may be associated with a first cell group, and one or more other CCs in the set of CCs may be associated with a second cell group. In some aspects, the first cell group is an MCG and the second cell group is an SCG.

At 420, BS 310 may transmit an indication of the set of CCs to UE 320. In some aspects, BS 310 may transmit the indication of the set of CCs via RRC signaling. In some aspects, BS 310 may transmit the indication of the set of CCs via a MAC CE, downlink control information (DCI), and/or the like.

UE 320 may receive the indication of the set of CCs. UE 320 may determine a group of CCs based at least in part on the set of CCs. In some aspects, the group of CCs matches the set of CCs. In some aspects, the group of CCs is a subset or superset of the set of CCs.

At 430, UE 320 may update a TCI state of one or more BWPs of one or more CCs, where the CCs are from the group of CCs. For example, UE 320 may update a TCI state of a respective BWP of each CC in the group of CCs. In some aspects, the set of CCs involves multiple groups of CCs, and some groups of CCs may be associated with multiple cell groups. In such a case, UE 320 may be prepared to update a TCI state for multiple groups of CCs or for multiple cell groups.

At 440, UE 320 may transmit a beam to BS 310 (or another UE, BS, or wireless device) based at least in part on the update of the TCI state for the group of CCs. For example, UE 320 may transmit a message using a beam with a TCI state that was updated as part of the TCI update for the group of CCs. As indicated above, FIG. 4 is provided as an example. Other examples may differ from what is described with respect to FIG. 4.

Figure 5:
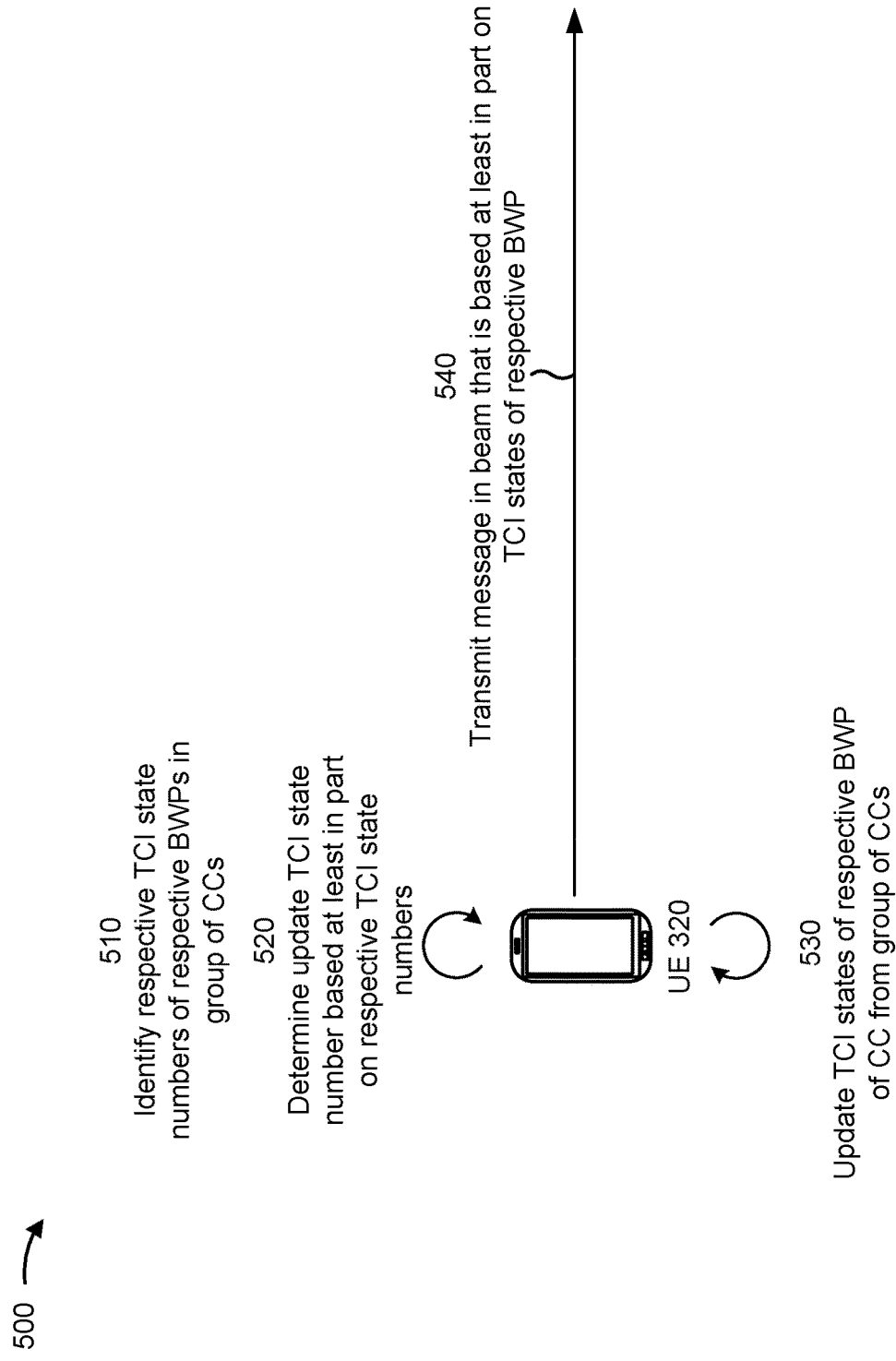
FIG. 5 is a diagram illustrating an example of updating a beam configuration for a group of component carriers.

FIG. 5 is a diagram illustrating an example 500 of updating a beam configuration for a group of CCs. In FIG. 5, UE 320 may determine a TCI state to apply to one or more BWPs of one or more CCs. The one or more CCs may be part of one or more groups of CCs.

There may be two scenarios for applying a TCI state update. A first scenario for the TCI state update may involve all BWPs, of a group of CCs to be updated, having a same number of TCI states per BWP. In this first scenario, the BWPs may have respective (e.g., possibly different) numbers of TCI states, and UE 320 may cause the BWPs to have the same number of TCI states per BWP. A second scenario for the TCI state update may allow a different number of TCI states per BWP. In this second scenario, the TCI state update may apply only to configured TCI states for each BWP.

At 510, UE 320 may identify a respective number of TCI states of a respective BWP of each CC in a group of CCs. A respective number of TCI states may be the number of TCI states per BWP, such as three TCI states for one BWP or five TCI states for another BWP.

If the number of TCI states per BWP varies for BWPs of a group of CCs, for the first scenario, all of the BWPs may be configured to have the same number of TCI states per BWP. This will assist with an update of TCI states for the BWPs for the group of CCs when an update of TCI states is to be applied to all BWPs of the group of CCs. UE 320 may determine the number of TCI states that is to be the same per BWP. This number of TCI states may be referred to as an "update TCI state number."

At 520, UE 320 may determine the update TCI state number based at least in part on the respective numbers of TCI states for the BWPs. For example, UE 320 may identify respective numbers of TCI states for multiple BWPs, where each BWP may be in a CC from the group of CCs. In this case, there may be multiple respective numbers of TCI states for the multiple BWPs. UE 320 may select one of these respective numbers of TCI states to be the update TCI state number. In some aspects, if the respective numbers of TCI states include numbers that are different, UE 320 may select a highest number of TCI states of the respective numbers of TCI states to be the update TCI state number. For example, if the respective numbers of TCI states for BWPs include two TCI states, three TCI states, and five TCI states, UE 320 may determine that the update TCI state number is the highest number of TCI states, which is five TCI states in this example. Rather than selecting the highest number of TCI states, UE 320 may select the lowest number of TCI states or a random one of the respective numbers of TCI states to be the update TCI state number.

In some aspects, UE 320 may configure the TCI states of respective BWPs in the group of CCs such that each respective BWP has the same TCI states. The TCI states of a particular BWP, from which the update TCI state number was selected, may be copied to the other BWPs of the group of CCs. For example, a first BWP may have three TCI states, and a second BWP may have five TCI states. If the update TCI state number was selected as the five TCI states of the second BWP, UE 320 may copy the five TCI states of the second BWP to the first BWP. In this case, the first BWP and the second BWP both have the same five TCI states.

As another example, as an alternative to the above example or in combination with the above example, UE 320 may select the update TCI state number based at least in part on CC identifiers of the CCs in the group of CCs. For example, UE 320 may select, as the update TCI state number, a number of TCI states configured for a BWP of a CC with a lowest CC identifier. The lowest CC identifier may be a lowest CC index among CC indices for a group of CCs. CC indices may be assigned to CCs randomly or according to a resource allocation. Rather than selecting the number of TCI states configured for a BWP of a CC with a lowest CC identifier, UE 320 may select the number of TCI states configured for a BWP of a CC with a highest CC identifier or a random one of the CC identifiers.

Additionally, or alternatively, UE 320 may select the update TCI state number based at least in part on BWP identifiers of BWPs for a CC or the group of CCs. For example, UE 320 may select, as the update TCI state number, a number of TCI states configured for a BWP with a lowest BWP identifier of BWPs for a CC or for the group of CCs. Rather than selecting the number of TCI states configured for a BWP with a lowest BWP identifier, UE 320 may select the number of TCI states configured for a BWP with a highest BWP identifier or a random one of the BWP identifiers. In some aspects, UE 320 may determine the update TCI state number by considering TCI states based at least in part on CC identifiers before considering TCI states based at least in part on BWP identifiers, or vice versa.

At 530, UE 320 may update one or more TCI states of a respective BWP of one or more CCs (or all CCs) from the group of CCs. For example, if UE 320 receives a signaling message indicating 8 and 10 as a set of TCI states to be activated, UE 320 may update a respective BWP in each CC of the group of CCs to have TCI states 8 and 10. This may involve UE 320 updating BWPs to have the same number of TCI states, based at least in part on the update TCI state number, as described above. In some aspects, UE 320 may update TCI states of multiple (e.g., all or a subset) BWPs in each CC with the one or more TCI states.

In some aspects, an update of TCI states for BWPs for a group of CCs may occur when the number of TCI states per BWP are not the same, as in the second scenario described above. In such a case, UE 320 may refrain from updating, or may ignore, TCI states configured for one BWP but not configured for another BWP. That is, if the respective numbers of TCI states per BWP include numbers that are different, UE 320 may refrain from updating (e.g., activating or deactivating) one or more TCI states of a BWP that are indicated in a TCI update signaling message but are not configured for the BWP. For example, a first BWP for a group of CCs may be configured with a number of TCI states that is different than a number of TCI states configured for a second BWP of the group of CCs. The first BWP may be configured with three TCI states, and the second BWP may be configured with five TCI states. If a particular TCI state is activated, which happens to be one of the five configured TCI states for the second BWP, but not configured for the first BWP, UE 320 may activate the particular TCI state for the second BWP and refrain from activating that particular TCI state for the first BWP.

In some aspects, if a number of TCI states differs from one BWP to another, UE 320 may select a maximum number of TCI states (e.g., 20 TCI states) that can be activated or deactivated. The maximum number of TCI states that can be activated or deactivated may be the highest number of TCI states configured for a BWP, among all the BWPs for the group of CCs. The maximum number of TCI states that can be activated or deactivated for a BWP may be referred to as a "maximum candidate number." In other words, UE 320 may determine an upper bound for the number of TCI states that can be activated or deactivated for a BWP.

At 540, UE 320 may transmit a message in a beam that is based at least in part on the TCI state of a respective BWP. The respective BWP may be for a CC from the group of CCs. As indicated above, FIG. 5 is provided as an example. Other examples may differ from what is described with respect to FIG. 5.

In some aspects, one or more aspects described for any of FIGS. 3-5 may be combined with or replace one or more aspects described in another one of FIGS. 3-5 as appropriate. In other words, example 300, example 400, and/or example 500 may be used alone or in combination.

Figure 6:
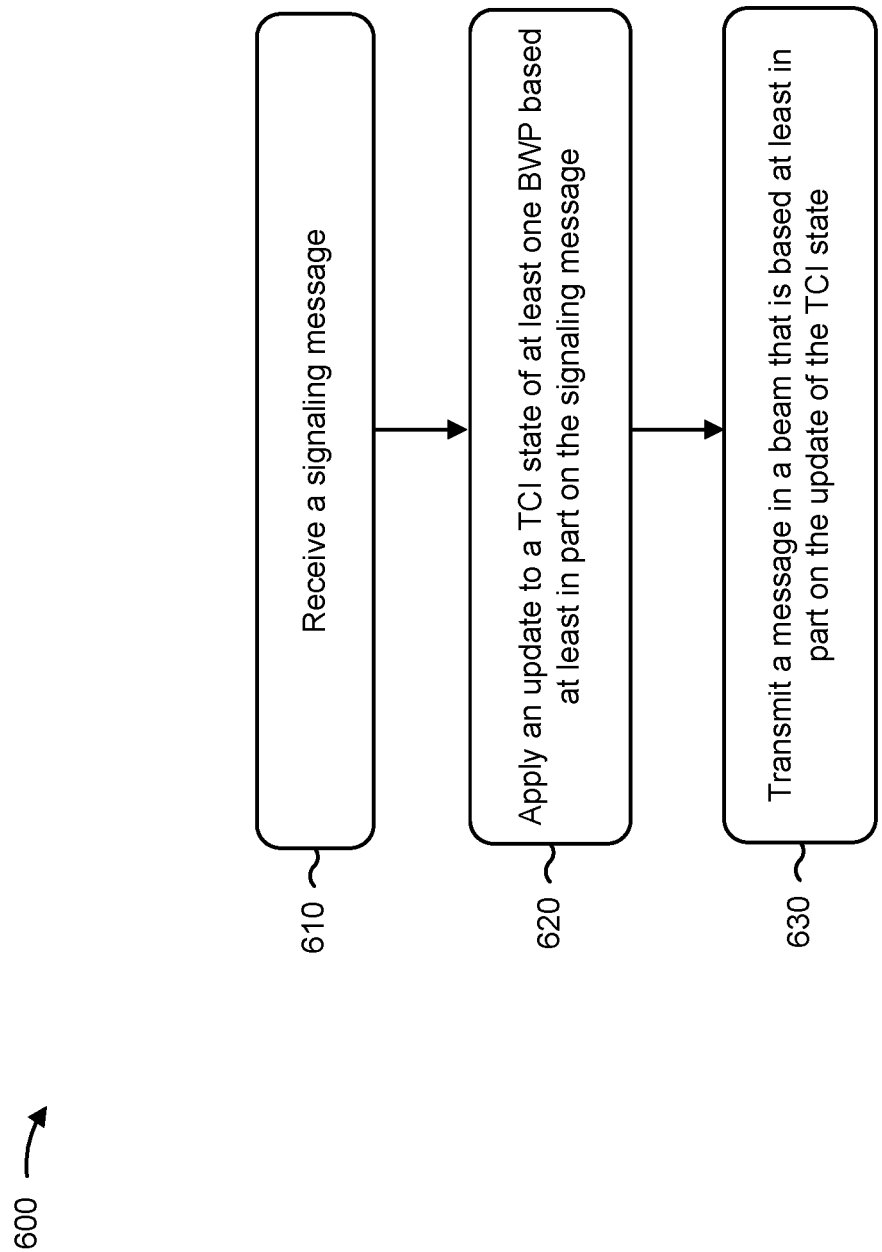
FIG. 6 is a flowchart of a method of wireless communication.

FIG. 6 is a diagram illustrating an example process 600 performed, for example, by a UE, in accordance with various aspects of the present disclosure. Example process 600 is an example where a UE (e.g., UE 120, UE 320, and/or the like) performs operations associated with updating a beam configuration for a group of CCs.

At 610, the UE may receive a signaling message. The signaling message may indicate an update of a TCI state for BWPs, where the BWPs include multiple CCs from a group of CCs. In some aspects, the signaling message may be a first format signaling message that indicates an update of a TCI state for a particular BWP of a particular CC of a group of CCs, or a second format signaling message that indicates an update of a TCI state for BWPs of multiple CCs from the group of CCs (block 610). For example, the UE (e.g., using receive processor 258, transmit processor 264, controller/processor 280, memory 282, and/or the like) may receive a signaling message, as described above.

At 620, the UE may apply an update to a TCI state of at least one BWP of a CC from the group of CCs based at least in part on the signaling message (block 620). For example, the UE (e.g., using receive processor 258, transmit processor 264, controller/processor 280, memory 282, and/or the like) may apply an update to a TCI state of at least one BWP in the group of CCs based at least in part on the signaling message, as described above.

At 630, the UE may transmit a message in a beam that is based at least in part on the update of the TCI state. The TCI state may be of a respective BWP of a CC from the group of CCs. For example, the UE (e.g., using receive processor 258, transmit processor 264, controller/processor 280, memory 282, and/or the like) may transmit a message in a beam that is based at least in part on the update of the TCI state.

Method 600 may include additional aspects, such as any single aspect or any combination of aspects described above and/or in connection with one or more other processes described elsewhere herein.

In a first aspect, the signaling message is a MAC CE.

In a second aspect, alone or in combination with the first aspect, the multiple CCs in the group of CCs include all CCs in the group of CCs.

In a third aspect, alone or in combination with one or more of the first and second aspects, the signaling message specifies that the update to the TCI state is to apply to the at least one BWP of a particular CC from the group of CCs, and applying the update includes applying the update to the TCI state for the at least one BWP of all CCs in the group of CCs.

In a fourth aspect, alone or in combination with one or more of the first through third aspects, process 600 includes transmitting a message in a beam that is based at least in part on the update of the TCI state.

In a fifth aspect, alone or in combination with one or more of the first through fourth aspects, process 600 includes receiving an indication of a set of CCs and determining the group of CCs based at least in part on the set of CCs.

In a sixth aspect, alone or in combination with one or more of the first through fifth aspects, all CCs in the set of CCs are associated with a same cell group.

In a seventh aspect, alone or in combination with one or more of the first through sixth aspects, the same cell group is an MCG.

In an eighth aspect, alone or in combination with one or more of the first through seventh aspects, the same cell group is an SCG.

In a ninth aspect, alone or in combination with one or more of the first through eighth aspects, the least one BWP for the group of CCs is configured with a TCI state number that is different than a TCI state number configured for another BWP of the group of CCs.

In a tenth aspect, alone or in combination with one or more of the first through ninth aspects, applying the update includes refraining from updating a TCI state of the other BWP.

In an eleventh aspect, alone or in combination with one or more of the first through tenth aspects, applying the update includes updating the TCI state of the at least one BWP based at least in part on a highest TCI state number among BWPs for the group of CCs.

In a twelfth aspect, alone or in combination with one or more of the first through eleventh aspects, applying the update includes identifying a respective TCI number for each respective BWP in the group of CCs, determining an update TCI state number based at least in part on the respective TCI state numbers for the respective BWPs, and updating the TCI states of the respective BWPs based at least in part on the update TCI state number.

In a thirteenth aspect, alone or in combination with one or more of the first through twelfth aspects, updating the TCI states of the respective BWPs includes updating the TCI states of the respective BWPs such that the respective BWPs of one or more CCs in the group of CCs each has a same TCI state.

In a fourteenth aspect, alone or in combination with one or more of the first through thirteenth aspects, determining the update TCI state number includes selecting a highest TCI state number of the respective TCI state numbers if the respective TCI state numbers are different.

In a fifteenth aspect, alone or in combination with one or more of the first through fourteenth aspects, determining the update TCI state number includes selecting a TCI state number from a CC with a lowest CC identifier.

In a sixteenth aspect, alone or in combination with one or more of the first through fifteenth aspects, applying the update includes updating the TCI state of the at least one BWP based at least in part on a highest TCI state number among BWPs for the group of CCs.

In a seventeenth aspect, alone or in combination with one or more of the first through sixteenth aspects, process 600 includes determining a maximum candidate number of a TCI state for activation or deactivation based at least in part on a highest number of the respective numbers.

In an eighteenth aspect, alone or in combination with one or more of the first through seventeenth aspects, process 600 includes transmitting a message in a beam that is based at least in part on the TCI state of the respective BWP of a CC in the group of CCs.

In a nineteenth aspect, alone or in combination with one or more of the first through eighteenth aspects, the update may be applied further based in part on a message processing rule.

In a twentieth aspect, alone or in combination with one or more of the first through nineteenth aspects, the message processing rule indicates that the update of the TCI state is applied to BWPs in the group of CCs when the signaling message is the first format signaling message or the second format signaling message.

In a twenty-first aspect, alone or in combination with one or more of the first through twentieth aspects, the message processing rule indicates that the update of the TCI state is applied to the particular BWP of the particular CC in the group of CCs when the signaling message is the first format signaling message and that the update of the TCI state is applied to BWPs in the group of CCs when the signaling message is the second format signaling message.

In a twenty-second aspect, alone or in combination with one or more of the first through twenty-first aspects, the signaling message is a MAC CE.

In a twenty-third aspect, alone or in combination with one or more of the first through twenty-second aspects, the multiple CCs from the group of CCs include all CCs in the group of CCs.

In a twenty-fourth aspect, alone or in combination with one or more of the first through twenty-third aspects, the applying of the update to the TCI state is based at least in part on a last received signaling message.

In a twenty-fifth aspect, alone or in combination with one or more of the first through twenty-fourth aspects, the UE may transmit a message in a beam that is based at least in part on the update of the TCI state.

In a twenty-sixth aspect, alone or in combination with one or more of the first through twenty-fifth aspects, the least one BWP for the group of CCs is configured with a TCI state number that is different than a TCI state number configured for another BWP of the group of CCs.

In a twenty-seventh aspect, alone or in combination with one or more of the first through twenty-sixth aspects, applying the update includes refraining from updating a TCI state of the other BWP.

In a twenty-eighth aspect, alone or in combination with one or more of the first through twenty-seventh aspects, applying the update includes updating the TCI state of the at least one BWP based at least in part on a highest TCI state number among BWPs for the group of CCs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
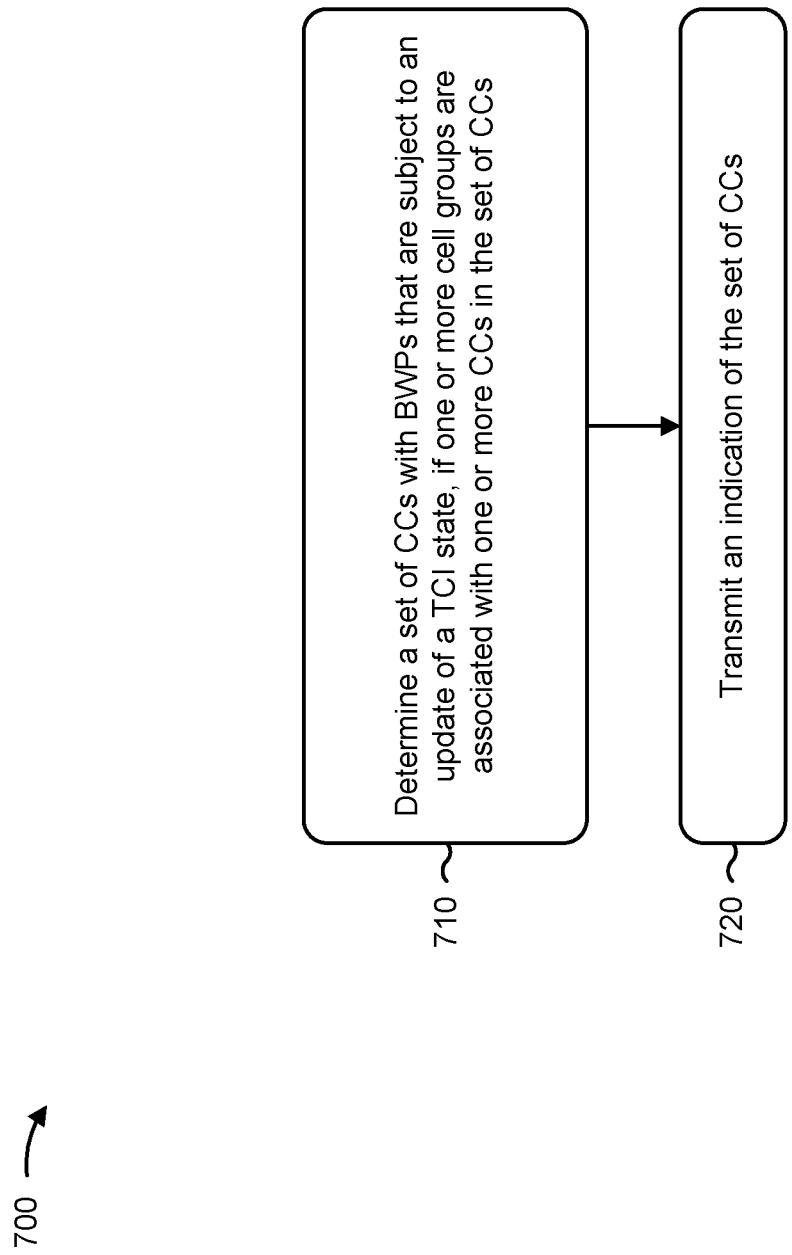
FIG. 7 is a flowchart of a method of wireless communication.

FIG. 7 is a diagram illustrating an example process 700 performed, for example, by a BS, in accordance with various aspects of the present disclosure. Example process 700 is an example where a BS (e.g., BS 110, BS 310, and/or the like) performs operations associated with determining and transmitting an indication of one or more sets of CCs.

At 710, the BS may determine a set of CCs with BWPs that are subject to an update of a TCI state, if one or more cell groups are associated with one or more CCs in the set of CCs (block 710). For example, the BS (e.g., using receive processor 238, transmit processor 220, controller/processor 240, memory 242, and/or the like) may determine a set of CCs with BWPs that are subject to an update of a TCI state, if one or more cell groups are associated with one or more CCs in the set of CCs, as described above.

At 720, the BS may transmit an indication of the set of CCs (block 720). For example, the BS (e.g., using receive processor 238, transmit processor 220, controller/processor 240, memory 242, and/or the like) may transmit an indication of the set of CCs, as described above.

Process 700 may include additional aspects, such as any single aspect or any combination of aspects described below and/or in connection with one or more other processes described elsewhere herein.

In a first aspect, all CCs in the set of CCs are associated with a same cell group. In a second aspect, alone or in combination with the first aspect, the same cell group is an MCG. In a third aspect, alone or in combination with one or more of the first and second aspects, the same cell group is an SCG.

In a fourth aspect, alone or in combination with one or more of the first through third aspects, one or more CCs in the set of CCs are associated with a first cell group and one or more other CCs in the set of CCs are associated with a second cell group. In a fifth aspect, alone or in combination with one or more of the first through fourth aspects, the first cell group is an MCG and the second cell group is an SCG.

In a sixth aspect, alone or in combination with one or more of the first through fifth aspects, process 700 further comprises transmitting a signaling message that indicates an update of a TCI state for BWPs of multiple CCs, wherein the multiple CCs are in a group of CCs that are associated with the set of CCs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
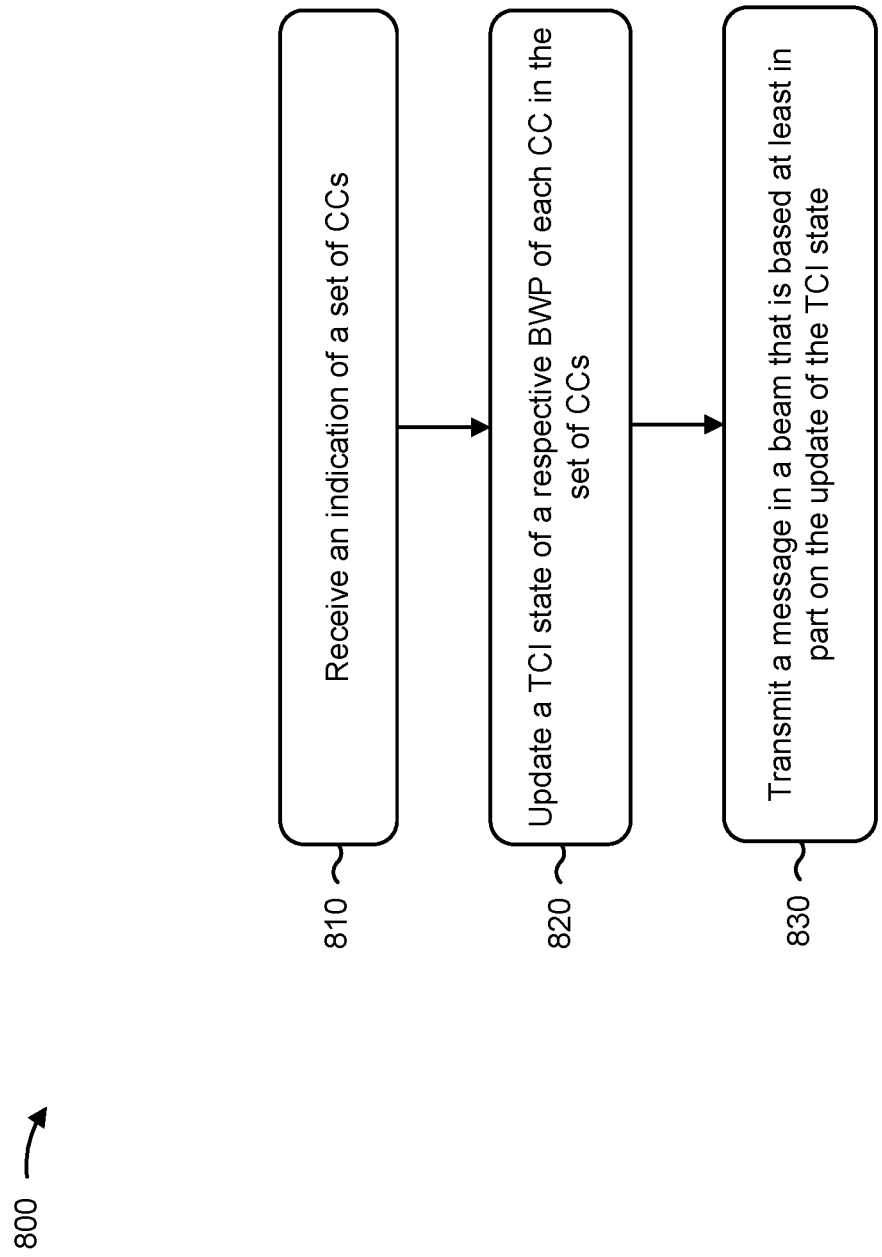
FIG. 8 is a flowchart of a method of wireless communication.

FIG. 8 is a diagram illustrating an example process 800 performed, for example, by a UE, in accordance with various aspects of the present disclosure. Example process 800 is an example where a UE (e.g., UE 120, UE 320, and/or the like) performs operations associated with receiving an indication of a set of CCs and updating a beam configuration for the set of CCs.

At 810, the UE may receive an indication of a set of CCs (block 810). For example, the UE (e.g., using receive processor 258, transmit processor 264, controller/processor 280, memory 282, and/or the like) may receive an indication of a set of CCs, as described above.

At 820, the UE may update a TCI state of a respective BWP of each CC in the set of CCs (block 820). For example, the UE (e.g., using receive processor 258, transmit processor 264, controller/processor 280, memory 282, and/or the like) may update a TCI state of a respective BWP of each CC in the set of CCs, as described above.

At 830, the UE may transmit a message in a beam that is based at least in part on the update of the TCI state. For example, the UE (e.g., using receive processor 258, transmit processor 264, controller/processor 280, memory 282, and/or the like) may transmit a message in a beam that is based at least in part on the update of the TCI state.

Process 800 may include additional aspects, such as any single aspect or any combination of aspects described below and/or in connection with one or more other processes described elsewhere herein.

In a first aspect, all CCs in the set of CCs are associated with a same cell group. In a second aspect, alone or in combination with the first aspect, the same cell group is an MCG. In a third aspect, alone or in combination with one or more of the first and second aspects, the same cell group is an SCG.

In a fourth aspect, alone or in combination with one or more of the first through third aspects, one or more CCs in the set of CCs are associated with a first cell group and one or more other CCs in the set of CCs are associated with a second cell group. In a fifth aspect, alone or in combination with one or more of the first through fourth aspects, the first cell group is an MCG and the second cell group is an SCG. In a sixth aspect, alone or in combination with one or more of the first through fifth aspects, the base station may transmit a message in a beam that is based at least in part on the TCI state of a respective BWP of a CC in the set of CCs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
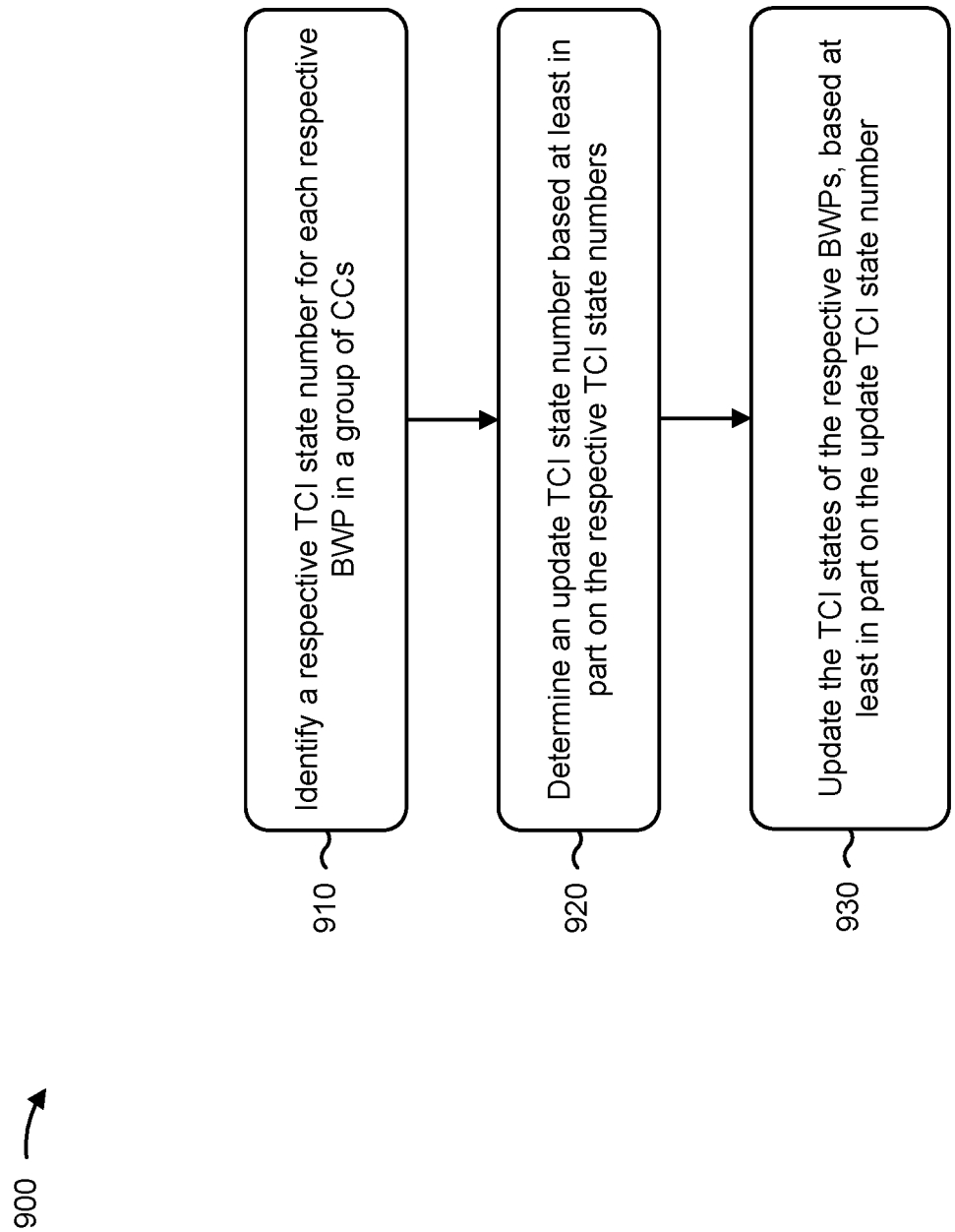
FIG. 9 is a flowchart of a method of wireless communication.

FIG. 9 is a diagram illustrating an example process 900 performed, for example, by a UE, in accordance with various aspects of the present disclosure. Example process 900 is an example where a UE (e.g., UE 120, UE 320, and/or the like) performs operations associated with updating a beam configuration for a group of CCs.

At 910, the UE may identify a respective TCI state number for each respective BWP of each CC in a group of CCs (block 910). For example, the UE (e.g., using receive processor 258, transmit processor 264, controller/processor 280, memory 282, and/or the like) may identify a respective TCI state number for each respective BWP of each CC in a group of CCs, as described above.

At 920, the UE may determine an update TCI state number based at least in part on the respective TCI state numbers for the respective BWPs (block 920). For example, the UE (e.g., using receive processor 258, transmit processor 264, controller/processor 280, memory 282, and/or the like) may determine an update TCI state number based at least in part on the respective TCI state numbers, as described above.

At 930, the UE may update the TCI states of the respective BWPs of one or more CCs in the set of CCs, based at least in part on the update TCI state number (block 930). For example, the UE (e.g., using receive processor 258, transmit processor 264, controller/processor 280, memory 282, and/or the like) may update the TCI states of the respective BWPs of one or more CCs in the set of CCs, based at least in part on the update TCI state number, as described above.

Process 900 may include additional aspects, such as any single aspect or any combination of aspects described below and/or in connection with one or more other processes described elsewhere herein.

In a first aspect, updating the TCI states of the respective BWPs includes updating the TCI states of the respective BWPs such that the respective BWPs of one or more CCs in the group of CCs each has a same TCI state. The TCI states may be the same TCI state as the TCI states of the respective BWP from which the update TCI state number was determined. In a second aspect, alone or in combination with the first aspect, determining the update TCI state number includes selecting a highest TCI state number of the respective TCI state numbers if the respective TCI state numbers are different. In a third aspect, alone or in combination with one or more of the first and second aspects, determining the update TCI state number includes selecting a TCI state number from a CC with a lowest CC identifier.

In a fourth aspect, alone or in combination with one or more of the first through third aspects, determining the update TCI state number includes selecting a number of TCI states from a respective BWP with a lowest BWP identifier. In a fifth aspect, alone or in combination with one or more of the first through fourth aspects, determining the update TCI state number includes selecting a lowest number of the respective numbers if the respective numbers include numbers that are different. In a sixth aspect, alone or in combination with one or more of the first through fifth aspects, determining the update TCI state number includes eliminating from selection or ignoring TCI states for a first BWP and not a second BWP, if the respective numbers include numbers that are different.

In a seventh aspect, alone or in combination with one or more of the first through sixth aspects, the UE may determine a maximum candidate number of TCI states for activation or deactivation based at least in part on a highest number of the respective numbers. In an eighth aspect, alone or in combination with one or more of the first through seventh aspects, the UE may transmit a message in a beam that is based at least in part on the TCI states of a respective BWP of a CC in the set of CCs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
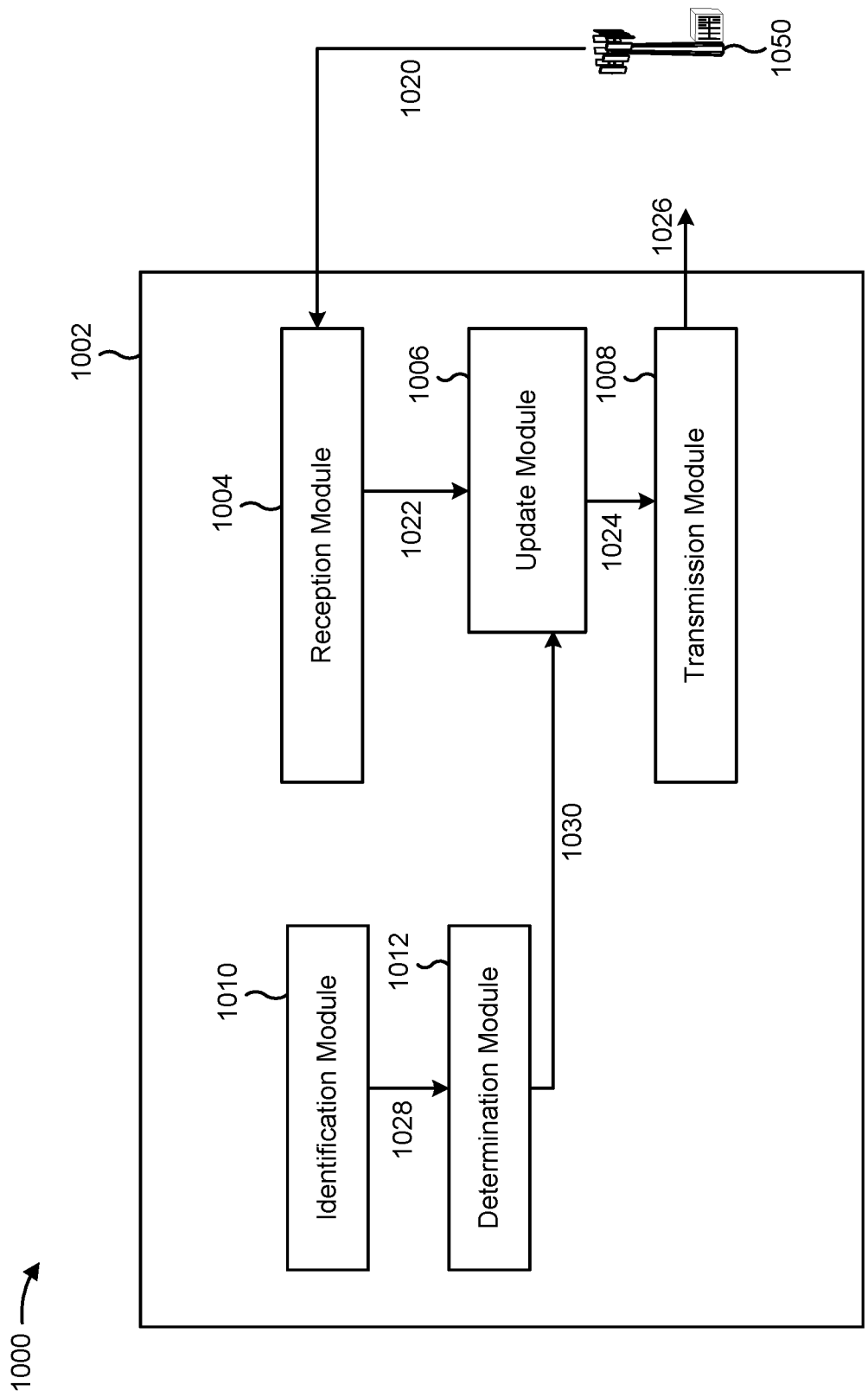
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, an update module 1006, a transmission module 1008, an identification module 1010, and a determination module 1012.

In some aspects, reception module 1004 may receive, as data 1020 from base station 1050, a signaling message. The signaling message may indicates an update of a TCI state for BWPs, where the BWPs include multiple CCs from a group of CCs. In some aspects, the signaling message may be a first format signaling message that indicates an update of a TCI state for a particular BWP of a particular CC of a group of CCs or a second format signaling message that indicates an update of a TCI state for BWPs of multiple CCs from the group of CCs. Update module 1006 may receive, as data 1022, the signaling message. Update module 1006 may apply an update to a TCI state of at least one BWP of a CC from the group of CCs based at least in part on the signaling message and, in some aspects, a message processing rule. Transmission module 1008 may receive, as data 1024, a beam configuration, and transmit the message, as data 1026, in a beam that is based at least in part on the beam configuration.

In some aspects, reception module 1004 may receive a set of CCs as data 1020. Update module 1006 may receive an indication of the set of CCs as data 1022 from reception module 1004 and update a TCI state of the respective BWP of one or more CCs in a set of CCs. The group of CCs may include the set of CCs or may be determined from the set of CCs. Transmission module 1008 may receive, as data 1024, an update of a TCI state, and transmit a message, as data 1026, in a beam that is based at least in part on the update of the TCI state.

In some aspects, identification module 1010 may identify a respective number of TCI states of a respective BWP of each CC in a set of CCs. Determination module 1012 may receive the respective numbers as data 1028 and determine an update TCI state number based at least in part on the respective numbers. Update module 1006 may receive the update number as data 1030 from determination module 1012 and update the TCI states of the respective BWP of one or more CCs in the set of CCs, based at least in part on the update number. Transmission module 1008 may receive, as data 1024, a beam configuration, and transmit a message, as data 1026, in a beam that is based at least in part on the beam configuration.

The apparatus may include additional modules that perform each of the blocks of the algorithm in the aforementioned method 600 of FIG. 6, method 800 of FIG. 8, method 900 of FIG. 9, and/or the like. Each block in the aforementioned method 600 of FIG. 6, method 800 of FIG. 8, method 900 of FIG. 9, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
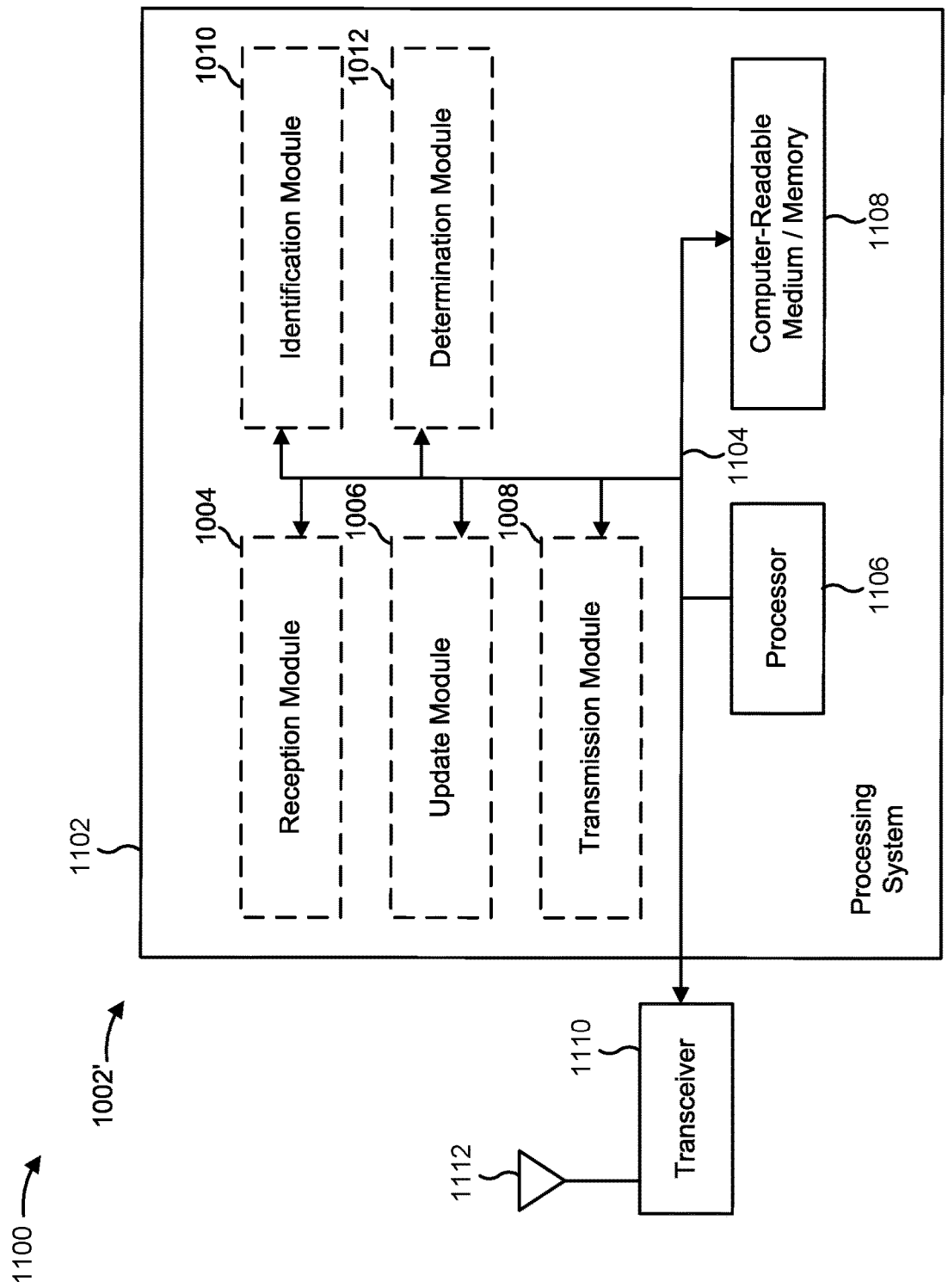
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, 1010, 1012 and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1008, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the modules 1006, 1010, 1012. The modules may be software modules running in the processor 1106, resident/stored in the computer readable medium/memory 1108, one or more hardware modules coupled to the processor 1106, or a combination thereof. The processing system 1102 may be a component of the UE 120 and may include the memory 282 and/or at least one of the TX MIMO processor 266, the RX processor 258, and/or the controller/processor 280.

In some aspects, the apparatus 1002/1002' for wireless communication includes means for receiving a signaling message. The signaling message may indicate an update of a TCI state for BWPs, where the BWPs include multiple CCs from a group of CCs. In some aspects, the signaling message is a first format signaling message that indicates an update of a TCI state for a particular BWP of a particular CC of a group of CCs or a second format signaling message that indicates an update of a TCI state for BWPs of multiple CCs in the group of CCs. The apparatus 1002/1002' also includes means for applying an update to a TCI state of at least one BWP based at least in part on the signaling message and a message processing rule. In some aspects, the apparatus 1002/1002' for wireless communication includes means for receiving an indication of a set of CCs as a group of CCs, and means for updating a TCI state of a respective BWP of each CC in the group of CCs. In some aspects, the apparatus 1002/1002' for wireless communication includes means for identifying a respective TCI number for each respective BWP in the group of CCs, means for determining an update TCI state number based at least in part on the respective TCI state numbers for the respective BWPs, and means for updating the TCI states of the respective BWPs based at least in part on the update TCI state number. The aforementioned means may be one or more of the aforementioned modules of the apparatus 1002 and/or the processing system 1102 of the apparatus 1002' configured to perform the functions recited by the aforementioned means. As described elsewhere herein, the processing system 1102 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
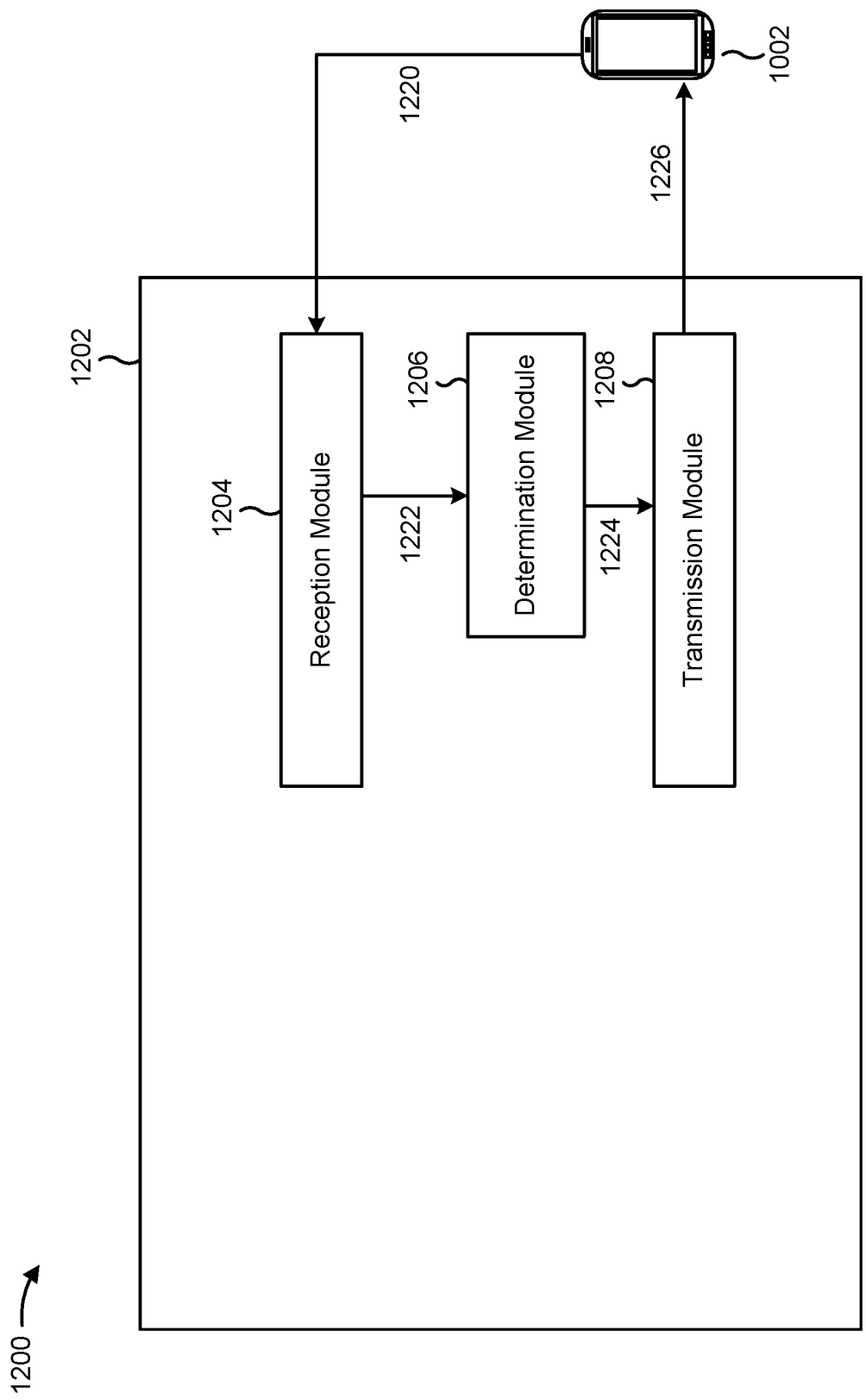
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a BS (e.g., the BS 110, the BS 310, the BS 1050, and/or the like). In some aspects, the apparatus 1202 includes a reception module 1204, a determination module 1206, and/or a transmission module 1208.

Reception module 1204 may receive data 1220 from UE 1002 and transmit data 1222 to determination module 1206.

In some aspects, determination module 1206 may determine a set of CCs with BWPs that are subject to an update of a TCI state, if one or more cell groups are associated with one or more CCs in the set of CCs. Reception module 1204 may receive an indication of the set of CCs as data 1224, and transmission module 1208 may transmit a set of CCs as data 1226 to UE 1002. In some aspects, transmission module 1208 may transmit a signaling message to update a TCI state of BWPs of a group of CCs associated with the set of CCs.

The apparatus may include additional modules that perform each of the blocks of the algorithm in the aforementioned method 700 of FIG. 7 and/or the like. Each block in the aforementioned method 700 of FIG. 7 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
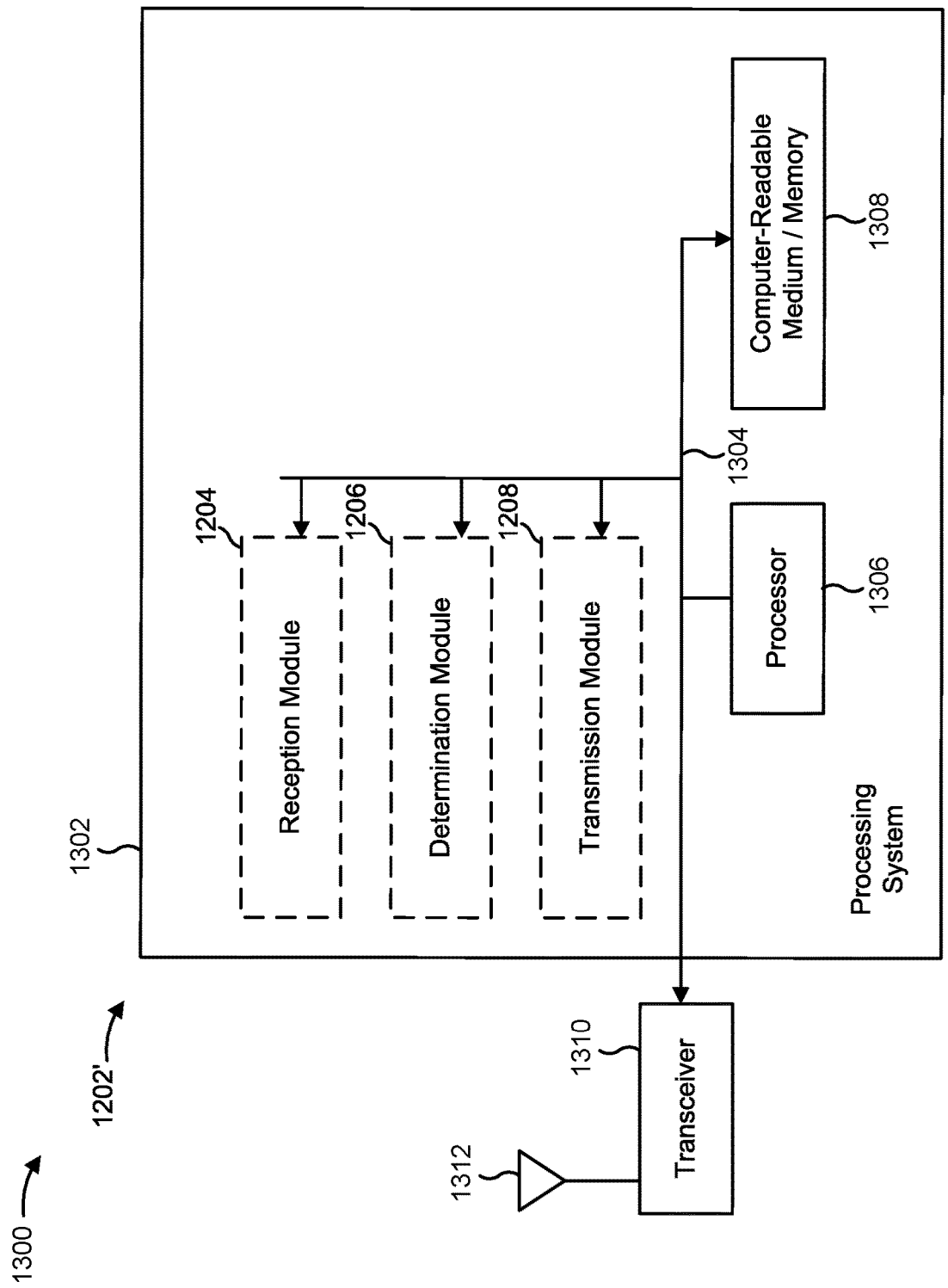
FIG. 13 is a diagram illustrating an example of a hardware implementation for an apparatus employing a processing system.

FIG. 13 is a diagram 1300 illustrating an example of a hardware implementation for an apparatus 1002' employing a processing system 1302. The apparatus 1002' may be BS.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and the computer-readable medium/memory 1308. The bus 1304 may also link various other circuits such as timing sources, peripherals, voltage regulators, and power management circuits, which are well known in the art, and therefore will not be described any further.

The processing system 1302 may be coupled to a transceiver 1310. The transceiver 1310 is coupled to one or more antennas 1312. The transceiver 1310 provides a means for communicating with various other apparatuses over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1208, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described herein for any particular apparatus. The computer-readable medium/memory 1308 may also be used for storing data that is manipulated by the processor 1306 when executing software. The processing system further includes at least module 1206. The modules may be software modules running in the processor 1306, resident/stored in the computer readable medium/memory 1308, one or more hardware modules coupled to the processor 1306, or a combination thereof. The processing system 1302 may be a component of the eNB 110 and may include the memory 242 and/or at least one of the TX MIMO processor 230, the RX processor 238, and/or the controller/processor 240.

In some aspects, the apparatus 1202/1202' for wireless communication includes means for means for determining a set of CCs with BWPs that are subject to an update of a TCI state, if one or more cell groups are associated with one or more CCs in the set of CCs, and means for transmitting an indication of the set of CCs. The aforementioned means may be one or more of the aforementioned modules of the apparatus 1202 and/or the processing system 1302 of the apparatus 1202' configured to perform the functions recited by the aforementioned means. As described elsewhere herein, the processing system 1302 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a signaling message that indicates an update of a transmission configuration indication (TCI) state for bandwidth parts (BWPs), wherein the BWPs include multiple component carriers (CCs) from a group of CCs, wherein at least one BWP of the group of CCs is configured with a TCI state number that is different than a TCI state number configured for another BWP of the group of CCs; and
   applying the update to a TCI state of the at least one BWP of the group of CCs based at least in part on the signaling message, wherein applying the update includes updating the TCI state of the at least one BWP based at least in part on a highest TCI state number among BWPs of the group of CCs.

2. The method of claim 1, wherein the signaling message is a medium access control control element.

3. The method of claim 1, wherein the multiple CCs from the group of CCs include all CCs in the group of CCs.

4. The method of claim 1, wherein the signaling message specifies that the update to the TCI state is to apply to the at least one BWP of a particular CC from the group of CCs, and wherein applying the update includes applying the update to the TCI state for the at least one BWP of all CCs in the group of CCs.

5. The method of claim 1, further comprising transmitting a message in a beam that is based at least in part on the update of the TCI state.

6. The method of claim 1, further comprising receiving an indication of a set of CCs and determining the group of CCs based at least in part on the set of CCs.

7. The method of claim 6, wherein all CCs in the set of CCs are associated with a same cell group.

8. The method of claim 7, wherein the same cell group is a master cell group.

9. The method of claim 7, wherein the same cell group is a secondary cell group.

10. The method of claim 6, further comprising transmitting a message in a beam that is based at least in part on the TCI state of a respective BWP of a CC from the group of CCs.

11. The method of claim 1, wherein applying the update includes refraining from updating a TCI state of the other BWP.

12. A method of wireless communication performed by a user equipment (UE), comprising:

receiving a signaling message that indicates an update of a transmission configuration indication (TCI) state for bandwidth parts (BWPs), wherein the BWPs include multiple component carriers (CCs) from a group of CCs;

applying the update to a TCI state of at least one BWP of the group of CCs based at least in part on the signaling message, wherein applying the update includes:

identifying a respective TCI state number for each respective BWP of the group of CCs;

determining an update TCI state number based at least in part on the respective TCI state numbers for the respective BWPs; and updating the TCI states of the respective BWPs based at least in part on the update TCI state number.

13. The method of claim 12, wherein updating the TCI states of the respective BWPs includes updating the TCI states of the respective BWPs such that the respective BWPs of one or more CCs in the group of CCs each has a same TCI state.

14. The method of claim 12, wherein determining the update TCI state number includes selecting a highest TCI state number of the respective TCI state numbers if the respective TCI state numbers are different.

15. The method of claim 12, wherein determining the update TCI state number includes selecting a TCI state number from a CC with a lowest CC identifier.

16. The method of claim 12, further comprising transmitting a message in a beam that is based at least in part on the TCI state of a respective BWP of a CC in the group of CCs.

17. A user equipment (UE) for wireless communication, comprising:

a memory; and one or more processors operatively coupled to the memory, the memory and the one or more processors configured to:

receive a signaling message that indicates an update of a transmission configuration indication (TCI) state for bandwidth parts (BWPs), wherein the BWPs include multiple component carriers (CCs) from a group of CCs, wherein at least one BWP of the group of CCs is configured with a TCI state number that is different than a TCI state number configured for another BWP of the group of CCs; and apply the update to a TCI state of the at least one BWP of the group of CCs based at least in part on the signaling message, wherein applying the update includes updating the TCI state of the at least one BWP based at least in part on a highest TCI state number among BWPs of the group of CCs.

18. The UE of claim 17, wherein the signaling message specifies that the update to the TCI state is to apply to the at least one BWP of a particular CC from the group of CCs, and wherein the one or more processors are configured to apply the update to the TCI state for the at least one BWP of all CCs in the group of CCs.

19. The UE of claim 17, wherein the one or more processors are configured to receive an indication of a set of CCs and determine the group of CCs based at least in part on the set of CCs, and wherein all CCs in the set of CCs are associated with a same cell group.

20. The UE of claim 19, wherein the same cell group is a master cell group.

21. The UE of claim 19, wherein the same cell group is a secondary cell group.

22. The UE of claim 17, wherein the least one BWP for the group of CCs is configured with a TCI state number that is different than a TCI state number configured for another BWP for the group of CCs.

23. A user equipment (UE) for wireless communication, comprising:

a memory; and one or more processors operatively coupled to the memory, the memory and the one or more processors configured to:

receive a signaling message that indicates an update of a transmission configuration indication (TCI) state for bandwidth parts (BWPs), wherein the BWPs include multiple component carriers (CCs) from a group of CCs;

apply the update to a TCI state of at least one BWP of the group of CCs based at least in part on the signaling message, wherein to apply the update the one or more processors are configured to:

identify a respective TCI state number for each respective BWP of the group of CCs;

determine an update TCI state number based at least in part on the respective TCI state numbers for the respective BWPs; and update the TCI states of the respective BWPs based at least in part on the update TCI state number.

24. The UE of claim 23, wherein, to update the TCI states of the respective BWPs, the memory and the one or more processors are configured to update the TCI states of the respective BWPs such that the respective BWPs of one or more CCs in the group of CCs each has a same TCI state.

25. The UE of claim 23, wherein, to determine the update TCI state number, the memory and one or more processors are configured to select a highest TCI state number of the respective TCI state numbers if the respective TCI state numbers are different.

26. The UE of claim 23, wherein, to determine the update TCI state number, the memory and the one or more processors are configured to select a TCI state number from a CC with a lowest CC identifier.

27. The UE of claim 23, wherein the memory and the one or more processors are further configured to transmit a message in a beam that is based at least in part on the TCI state of a respective BWP of a CC in the group of CCs.

* * * * *